(12) United States Patent
Toyoda

(10) Patent No.: US 10,298,054 B2
(45) Date of Patent: May 21, 2019

(54) UNINTERRUPTIBLE POWER SUPPLY

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 2 days.

(21) Appl. No.: 15/572,371

(22) PCT Filed: Jul. 7, 2015

(86) PCT No.: PCT/JP2015/069503
§ 371 (c)(1),
(2) Date: Nov. 7, 2017

(87) PCT Pub. No.: WO2017/006427
PCT Pub. Date: Jan. 12, 2017

(65) Prior Publication Data
US 2018/0278088 A1     Sep. 27, 2018

(51) Int. Cl.
*H02J 3/18*     (2006.01)
*H02J 9/06*     (2006.01)

(52) U.S. Cl.
CPC ............. *H02J 9/062* (2013.01); *H02J 3/18* (2013.01); *H02J 9/06* (2013.01); *Y02E 40/30* (2013.01)

(58) Field of Classification Search
CPC ..... H02J 9/062; H02J 9/06; H02J 3/18; Y02E 40/30
See application file for complete search history.

(56) References Cited

FOREIGN PATENT DOCUMENTS

JP     2011-55570 A     3/2011

OTHER PUBLICATIONS

International Search Report dated Oct. 6, 2015 in PCT/JP2015/069503 filed Jul. 7, 2015.

*Primary Examiner* — Robert L Deberadinis
(74) *Attorney, Agent, or Firm* — Oblon, McClelland, Maier & Neustadt, L.L.P.

(57) ABSTRACT

An uninterruptible power supply is configured to receive, together with a first load, AC power supplied from an AC power source. The uninterruptible power supply includes: a converter configured to convert AC power from the AC power source into DC power; an inverter configured to convert DC power generated by the converter or DC power in a battery into AC power to supply the converted power to a second load; a controller configured to control reactive power generated at the converter to compensate at least a part of reactive power generated at the first load; and a limiter configured to limit reactive power generated at the converter to upper limit power or lower. The upper limit power is set to a value according to the difference between the rated capacity of the uninterruptible power supply and AC power supplied to the second load.

13 Claims, 13 Drawing Sheets

UNINTERRUPTIBLE POWER SUPPLY

TECHNICAL FIELD

The present invention relates to an uninterruptible power supply, and more particularly to an uninterruptible power supply that receives, together with a first load, AC power supplied from an AC power source and supplies AC power to a second load.

BACKGROUND ART

Japanese Patent Laying-Open No. 2011-55570 (PTD 1) discloses a technique where parallelly connected load and uninterruptible power supply are connected to an AC power source, where reactive power generated at the load is compensated with reactive power generated at the uninterruptible power supply, and where the power factor of the load and the uninterruptible power supply is controlled to 1.

CITATION LIST

Patent Document

PTD 1: Japanese Patent Laying-Open No. 2011-55570

SUMMARY OF INVENTION

Technical Problem

In PTD 1, however, reactive power generated at the load is wholly compensated with reactive power generated at the uninterruptible power supply. Accordingly, if large reactive power is generated at the load, a high-capacity uninterruptible power supply is required, which disadvantageously causes upsizing of the apparatus and increase in cost.

Therefore, a main object of the present invention is to provide an uninterruptible power supply that can compensate reactive power generated at a load within the range of rated capacity.

Solution to Problem

An uninterruptible power supply according to the present invention is an uninterruptible power supply configured to receive, together with a first load, AC power supplied from an AC power source, the uninterruptible power supply including: a converter configured to convert AC power from the AC power source into DC power; an inverter configured to convert DC power generated by the converter or DC power in a power storage device into AC power to supply the converted power to a second load; a controller configured to control reactive power generated at the converter to compensate at least a part of reactive power generated at the first load; and a limiter configured to limit reactive power generated at the converter to upper limit power or lower. The upper limit power is set to a value according to the difference between the rated capacity of the uninterruptible power supply and AC power supplied to the second load.

Advantageous Effects of Invention

An uninterruptible power supply according to the present invention limits reactive power generated at a converter to less than or equal to upper limit power having a value according to the difference between the rated capacity of the uninterruptible power supply and AC power supplied to a second load. Accordingly, reactive power generated at a first load can be compensated within the range of rated capacity of the uninterruptible power supply. Therefore, downsizing of the apparatus and reduction in cost can be achieved compared to a case where reactive power generated at a first load is wholly compensated.

DESCRIPTION OF EMBODIMENTS

[Embodiment 1]

Figure 1:
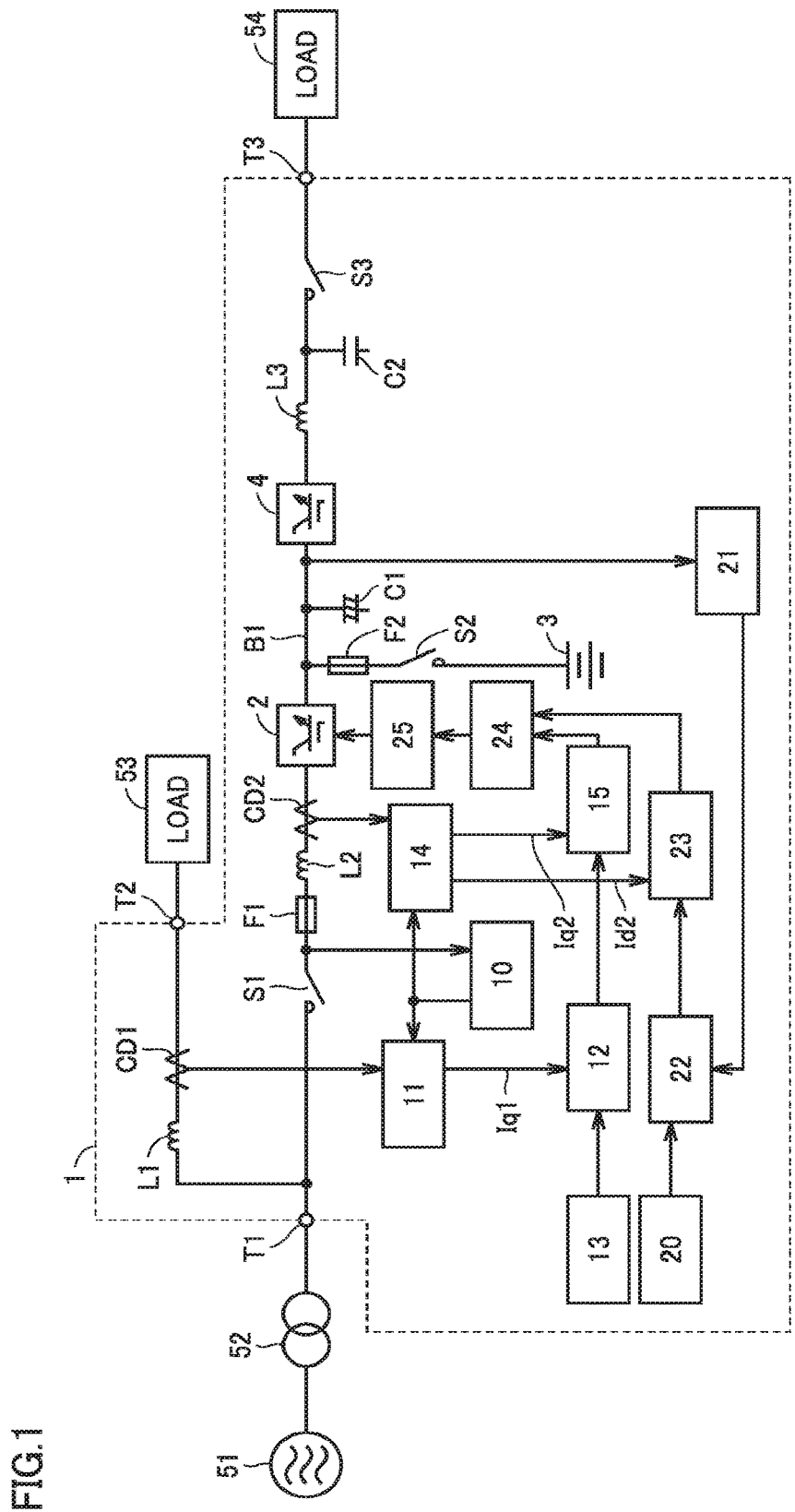
FIG. 1 is a circuit block diagram showing a configuration of an uninterruptible power supply according to Embodiment 1 of the present invention.

FIG. 1 is a circuit block diagram showing a configuration of an uninterruptible power supply 1 according to Embodiment 1 of the present invention. Uninterruptible power supply 1 receives, together with a load 53 (first load), three-phase AC power having a commercial frequency supplied from a commercial AC power source 51 through a transformer 52 and supplies three-phase AC power having a commercial frequency to a load 54 (second load). FIG. 1, however, shows a part related to only a single phase for simplicity of the drawing and the explanation.

In FIG. 1, uninterruptible power supply 1 includes an input terminal T1, output terminals T2, T3, reactors L1 to L3, current detectors CD1, CD2, switches S1 to S3, fuses F1, F2, a converter 2, a DC bus B1, a battery 3, capacitors C1, C2, and an inverter 4.

Input terminal T1 receives AC power having a commercial frequency supplied from commercial AC power source 51 through transformer 52. To output terminal T2, load 53 to be driven with AC power is connected. To output terminal T3, load 54 to be driven with AC power is connected.

Reactor L1 has one terminal connected to input terminal T1 and has the other terminal connected to output terminal T2. Reactor L1 constitutes a low-pass filter to allow passage of AC power having a commercial frequency supplied from commercial AC power source 51 through transformer 52 and to interrupt a signal having a high frequency generated at load 53. Current detector CD1 detects an instantaneous value of an AC current flowing between the other terminal of reactor L1 and output terminal T2, and outputs a signal representing the detection value.

Actually, corresponding to a three-phase AC current, there are three sets of input terminal T1, reactor L1, current detector CD1, and output terminal T2. Each of three current detectors CD1 (first current detector) detects an instantaneous value of a three-phase AC current flowing between the other terminal of a corresponding one of three reactors L1 (first three-phase reactor) and a corresponding one of three output terminals T2, and outputs a signal representing the detection value.

Switch S1 has one terminal connected to input terminal T1 and has the other terminal connected to one terminal of reactor L2 through fuse F1. Reactor L2 has the other terminal connected to an input node of converter 2. Switch S1 is ON during a normal time in which AC power is supplied from commercial AC power source 51, and is OFF during a power failure time in which supply of AC power from commercial AC power source 51 is stopped. Fuse F1 is blown when an overcurrent flows, so as to protect components, such as converter 2.

Reactor L2 constitutes a low-pass filter to allow passage of AC power having a commercial frequency supplied from commercial AC power source 51 through transformer 52 and to interrupt a signal having a switching frequency generated at converter 2. Current detector CD2 detects an instantaneous value of an AC current flowing between the other terminal of reactor L2 and the input node of converter 2, and outputs a signal representing the detection value.

Actually, corresponding to a three-phase AC current, there are three sets of input terminal T1, switch S1, fuse F1, reactor L2, and current detector CD2. Each of three current detectors CD2 (second current detector) detects an instantaneous value of a three-phase AC current flowing between a corresponding one of three reactors L2 (second three-phase reactor) and a corresponding one of three input nodes of converter 2, and outputs a signal representing the detection value.

During a normal time in which AC power is supplied from commercial AC power source 51, converter 2 converts AC power from commercial AC power source 51 into DC power to store the DC power in battery 3 and to supply the DC power to inverter 4 through DC bus B1. During a power failure time in which supply of AC power from commercial AC power source 51 is stopped, the operation of converter 2 is stopped. Converter 2 is also used to compensate reactive power generated at load 53. The operation for compensating reactive power will be described in detail later.

Fuse F2 and switch S2 are connected in series between DC bus B1 and battery 3. Fuse F2 is blown when an overcurrent flows, so as to protect components, such as converter 2 and battery 3. Switch S2 is ON during a normal time, and is OFF during, for example, maintenance of battery 3. During a normal time, battery 3 (power storage device) stores DC power generated by converter 2. During a power failure time, battery 3 supplies DC power to inverter 4. Capacitor C1 is connected to DC bus B1 to smooth and stabilize a DC voltage of DC bus B1.

During a normal time in which AC power is supplied from commercial AC power source 51, inverter 4 converts DC power generated by converter 2 into AC power having a commercial frequency. During a power failure time in which supply of AC power from commercial AC power source 51 is stopped, inverter 4 converts DC power in battery 3 into AC power having a commercial frequency.

Reactor L3 has one terminal connected to an output node of inverter 4, and has the other terminal connected to one terminal of switch S3. Switch S3 has the other terminal connected to output terminal T3. Capacitor C2 is connected to the other terminal of reactor L3. Reactor L3 and capacitor C2 constitute a low-pass filter to allow passage of AC power having a commercial frequency generated by inverter 4 and to interrupt a signal having a switching frequency generated at inverter 4. In other words, reactor L3 and capacitor C2 shape the waveform of an AC voltage generated by inverter 4 into a sinusoidal wave. Switch S3 is ON during a normal time, and is ON during, for example, maintenance of uninterruptible power supply 1.

Actually, there are three sets of reactor L3, capacitor C2, switch S3, and output terminal T3. Three-phase AC power generated by inverter 4 is supplied to load 54 through the three sets of these components, such as reactor L3.

Uninterruptible power supply 1 further includes a phase detector 10, coordinate transformers 11, 14, a reactive current instructing unit 12, a limiter 13, current controllers 15, 23, a DC voltage instructing unit 20, a voltage detector 21, a voltage controller 22, a voltage vector calculating unit 24, and a PWM (pulse width modulation) controller 25.

Phase detector 10 detects phases $\theta$ of a three-phase AC voltage between three switches S1 and three fuses F1, and outputs signals representing the detection values $\theta$ to coordinate transformers 11, 14. Based on detection values $\theta$ from phase detector 10, coordinate transformer 11 (first coordinate transformer) performs coordinate transformation of a three-phase AC current detected by three current detectors CD1, and generates a d-axis current and a q-axis current Iq1. The d-axis current corresponds to an active current of the three-phase AC current, and the q-axis current Iq1 corresponds to a reactive current of the three-phase AC current. The d-axis current is not used here.

Coordinate transformer 11 performs two-step coordinate transformation to transform a three-phase AC current into d-axis current and q-axis current Iq1. First, coordinate transformer 11 transforms a UVW three-phase coordinate system into an $\alpha\beta$ fixed coordinate system by using the nature of a three-phase AC current having phases shifted by 120° from each other where the sum of the phase currents is zero, so as to transform the three-phase AC current into a biphasic AC current ($\alpha$-axis current and $\beta$-axis current). Coordinate transformer 11 then transforms the $\alpha\beta$ fixed coordinate system into a dq rotating coordinate system by using a biphasic AC current rotating while keeping a phase difference of 90°, so as to transform the biphasic AC current into two DC signals (d-axis current and q-axis current Iq1). The transformation of the three-phase AC current into two DC signals can achieve simplification of the control.

Based on q-axis current Iq1 generated by coordinate transformer 11, reactive current instructing unit 12 generates a reactive current instruction value (q-axis current instruction value) for compensating a reactive current generated at load 53. Limiter 13 limits the reactive current instruction value output from reactive current instructing unit 12 to an upper limit value or less. The upper limit value is a value acquired by converting the current value of the difference between the rated current of uninterruptible power supply 1 and the rated current of load 54, into a DC signal (q-axis current), and is predetermined for limiter 13. The reactive current instruction value limited to the upper limit value or less is provided to current controller 15.

Based on detection values θ from phase detector 10, coordinate transformer 14 (second coordinate transformer) performs coordinate transformation of a three-phase AC current detected by three current detectors CD2, so that the three-phase AC current is transformed into d-axis current Id2 and q-axis current Iq2. The d-axis current Id2 corresponds to an active current of the three-phase AC current, and the q-axis current Iq2 corresponds to a reactive current of the three-phase AC current. The d-axis current Id2 and the q-axis current Iq2 generated by coordinate transformer 14 are provided to current controller 23 and current controller 15, respectively.

Current controller 15 acquires the deviation of q-axis current Iq2 from coordinate transformer 14 from a reactive current instruction value limited to an upper limit value or less from reactive current instructing unit 12, and outputs, to voltage vector calculating unit 24, a voltage instruction value for removing the deviation.

DC voltage instructing unit 20 outputs a DC voltage instruction value for determining a DC voltage of DC bus B1. Voltage detector 21 detects an instantaneous value of a DC voltage of DC bus B1, and outputs a signal representing the detection value. Voltage controller 22 acquires the deviation of a detection value from voltage detector 21 from a DC voltage instruction value from DC voltage instructing unit 20, and outputs an active current instruction value (d-axis current instruction value) for removing the deviation.

Current controller 23 acquires the deviation of d-axis current Id2 from coordinate transformer 14 from an active current instruction value from voltage controller 22, and outputs, to voltage vector calculating unit 24, a voltage instruction value for removing the deviation.

Voltage vector calculating unit 24 performs coordinate transformation opposite to that of coordinate transformers 11, 14, so as to transform two voltage instruction values from current controllers 15, 23 into a three-phase AC voltage instruction value. PWM controller 25 generates a three-phase PWM signal in accordance with the three-phase AC voltage instruction value from voltage vector calculating unit 24, and provides the three-phase PWM signal to converter 2.

Converter 2 is controlled with a three-phase PWM signal from PWM controller 25 and converts three-phase AC power supplied from commercial AC power source 51 into DC power. Further, converter 2 generates, on the input node side, a reactive current for compensating a reactive current generated at load 53. Accordingly, a reactive current generated at load 53 is compensated with a reactive current generated at converter 2, thus reducing a reactive current flowing from transformer 52 to input terminal T1.

Figure 2:
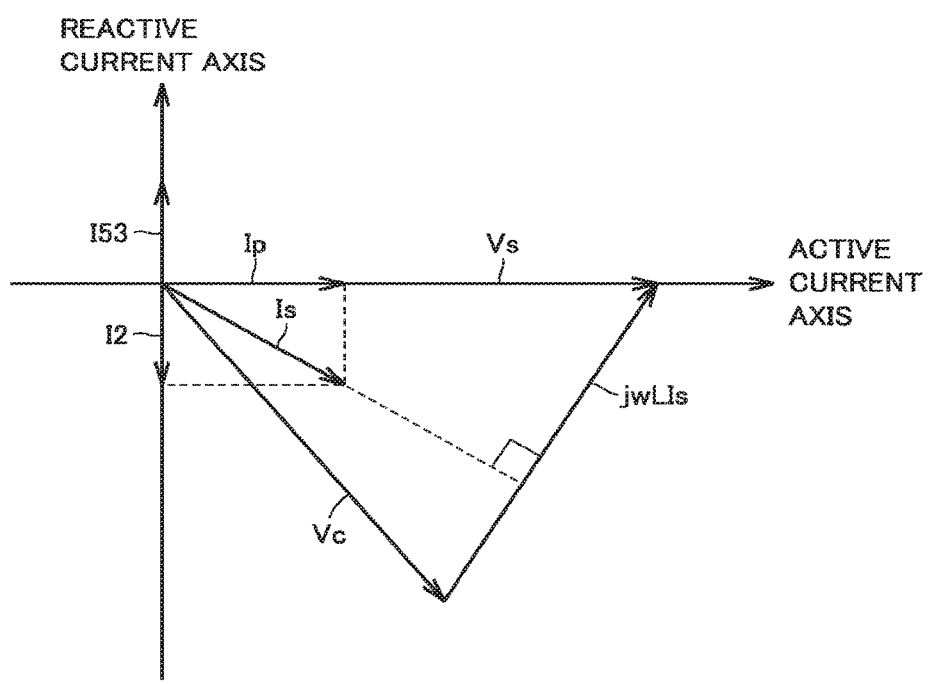
FIG. 2 shows the relationship between a reactive current generated at load 53 shown in FIG. 1 and a reactive current generated at a converter.

FIG. 2 shows the relationship between a reactive current I53 generated at load 53 and a reactive current I2 generated at converter 2. In FIG. 2, the horizontal axis is an active current axis, and the vertical axis is a reactive current axis. In FIG. 2, an AC voltage Vs supplied from commercial AC power source 51 through transformer 52 is defined as a reference vector. At reactor L2, an AC current Is flows, the AC current Is having a phase retarded relative to AC voltage Vs. AC current Is includes an active current Ip and reactive current I2. The sum of input voltage Vc of converter 2 and jωL Is is Vs, where L denotes the reactance of reactor L2.

By controlling converter 2, each of active current Ip and reactive current I2 can be controlled. Reactive current I53 generated at load 53 is the same in meaning as reactive current I53 flowing into load 53. Reactive current I2 generated at converter 2 is the same in meaning as reactive current I2 flowing into converter 2.

If the rated current of uninterruptible power supply 1 is large enough relative to reactive current I53 generated at load 53, the sum of reactive current I53 generated at load 53 and reactive current I2 generated at converter 2 is 0 A. In such a case, reactive current I53 generated at load 53 is wholly compensated with reactive current I2 generated at converter 2, a reactive current flowing from transformer 52 to input terminal T1 is 0 A, and the power factor of the electrical equipment on the input terminal T1 side relative to transformer 52 is 1.

Next, the operation of uninterruptible power supply 1 is described. During a normal time in which AC power is supplied from commercial AC power source 51, all of switches S1 to S3 are ON. AC power from commercial AC power source 51 is provided to input terminal T1 through transformer 52. AC power provided to input terminal T1 is supplied to load 53 through reactor L1 and is supplied to converter 2 through switch S1, fuse F1, and reactor L2 to be converted to DC power. DC power generated by converter 2 is supplied to battery 3 through fuse F2 and switch S2, and is converted into AC power by inverter 4. AC power generated by inverter 4 is supplied to load 54 through a filter including reactor L3 and capacitor C2 and through switch S3.

At this time, a three-phase AC current flowing through load 53 is detected by three current detectors CD1, and the detection values of the three-phase AC current are each transformed into q-axis current Iq1 by phase detector 10 and coordinate transformer 11. This q-axis current Iq1 corresponds to a reactive current generated at load 53. Based on this q-axis current Iq1, a reactive current instruction value for compensating the reactive current generated at load 53 is generated by reactive current instructing unit 12. The reactive current instruction value is limited to an upper limit value or less by limiter 13. The upper limit value is set to a value according to the difference between the rated current of uninterruptible power supply 1 and the rated current of load 54.

On the other hand, a three-phase AC current flowing through converter 2 is detected by three current detectors CD2, and the detection values of the three-phase AC current are each transformed into d-axis current Id2 and q-axis current Iq2 by phase detector 10 and coordinate transformer 14. The d-axis current Id2 corresponds to an active current flowing through converter 2, and the q-axis current Iq2 corresponds to a reactive current flowing through converter 2. Current controller 15 generates a voltage instruction value so as to remove the deviation of q-axis current Iq2 from coordinate transformer 14 from a reactive current instruction value from reactive current instructing unit 12.

Further, voltage detector 21 detects a DC voltage of DC bus B1, and voltage controller 22 generates an active current instruction value so as to remove the deviation of the detection value from voltage detector 21 from a DC voltage instruction value from DC voltage instructing unit 20. So as to remove the deviation of d-axis current Id2 from coordinate transformer 14 from the active current instruction value, current controller 23 generates a voltage instruction value.

Two voltage instruction values generated by current controllers 15, 23 are transformed into a three-phase AC voltage instruction value by voltage vector calculating unit 24. Based on the three-phase AC voltage instruction value, PWM controller 25 generates a three-phase PWM signal with which to control converter 2.

Thus, a reactive current lower than or equal to the upper limit value of a reactive current generated at load 53 (the difference between the rated current of uninterruptible power supply 1 and the rated current of load 54) is compensated. That is, if a reactive current generated at load 53 is more than the upper limit value, a part of the reactive current generated at load 53 is compensated, whereas, if a reactive current generated at load 53 is less than the upper limit value, all of the reactive current generated at load 53 is compensated.

During a power failure time in which supply of AC power from commercial AC power source 51 is stopped, switch S1 is OFF and the operation of converter 2 is stopped. DC power in battery 3 is converted by inverter 4 into AC power having a commercial frequency to be supplied to load 54. Thus, the operation of load 54 can be continued as long as battery 3 stores DC power.

In Embodiment 1, limiter 13 is provided to limit a reactive current generated at converter 2 to an upper limit value or less, the upper limit value being a value according to the difference between the rated current of uninterruptible power supply 1 and the rated current of load 54. Accordingly, a reactive current generated at load 53 can be compensated within the range of rated current of uninterruptible power supply 1. Therefore, downsizing of the apparatus and reduction in cost can be achieved compared to a case where a reactive current generated at load 53 is wholly compensated by an uninterruptible power supply.

Note that, in Embodiment 1, although a reactive current generated at converter 2 is limited to an upper limit value or less, the upper limit value being a value according to the difference between the rated current of uninterruptible power supply 1 and the rated current of load 54, reactive power generated at converter 2 may be limited to an upper limit value or less, the upper limit value being a value according to the difference between the rated capacity of uninterruptible power supply 1 and the rated power of load 54.

[Embodiment 2]

Figure 3:
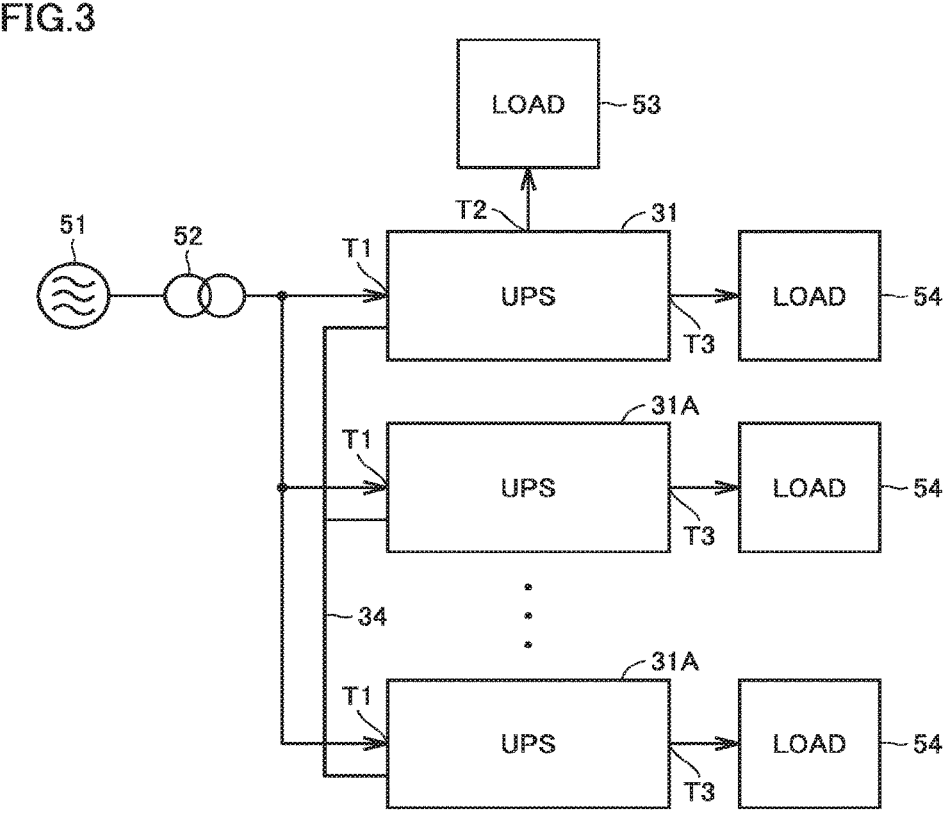
FIG. 3 is a circuit block diagram showing a configuration of an uninterruptible power supply system according to Embodiment 2 of the present invention.

FIG. 3 is a block diagram showing a configuration of an uninterruptible power supply system according to Embodiment 2 of the present invention. In FIG. 3, the uninterruptible power supply system includes an uninterruptible power supply (UPS) 31 and a plurality of uninterruptible power supplies 31A. Each of uninterruptible power supply 31 and a plurality of uninterruptible power supplies 31A receives, together with load 53, AC power supplied from commercial AC power source 51 through transformer 52 and supplies AC power to load 54.

Uninterruptible power supply 31 and a plurality of uninterruptible power supplies 31A are coupled to one another with a communication line 34, and each uninterruptible power supply exchanges various types of information with each of other uninterruptible power supplies through communication line 34. Uninterruptible power supply 31 and a plurality of uninterruptible power supplies 31A compensate reactive power generated at load 53 in cooperation with one another.

Figure 4:
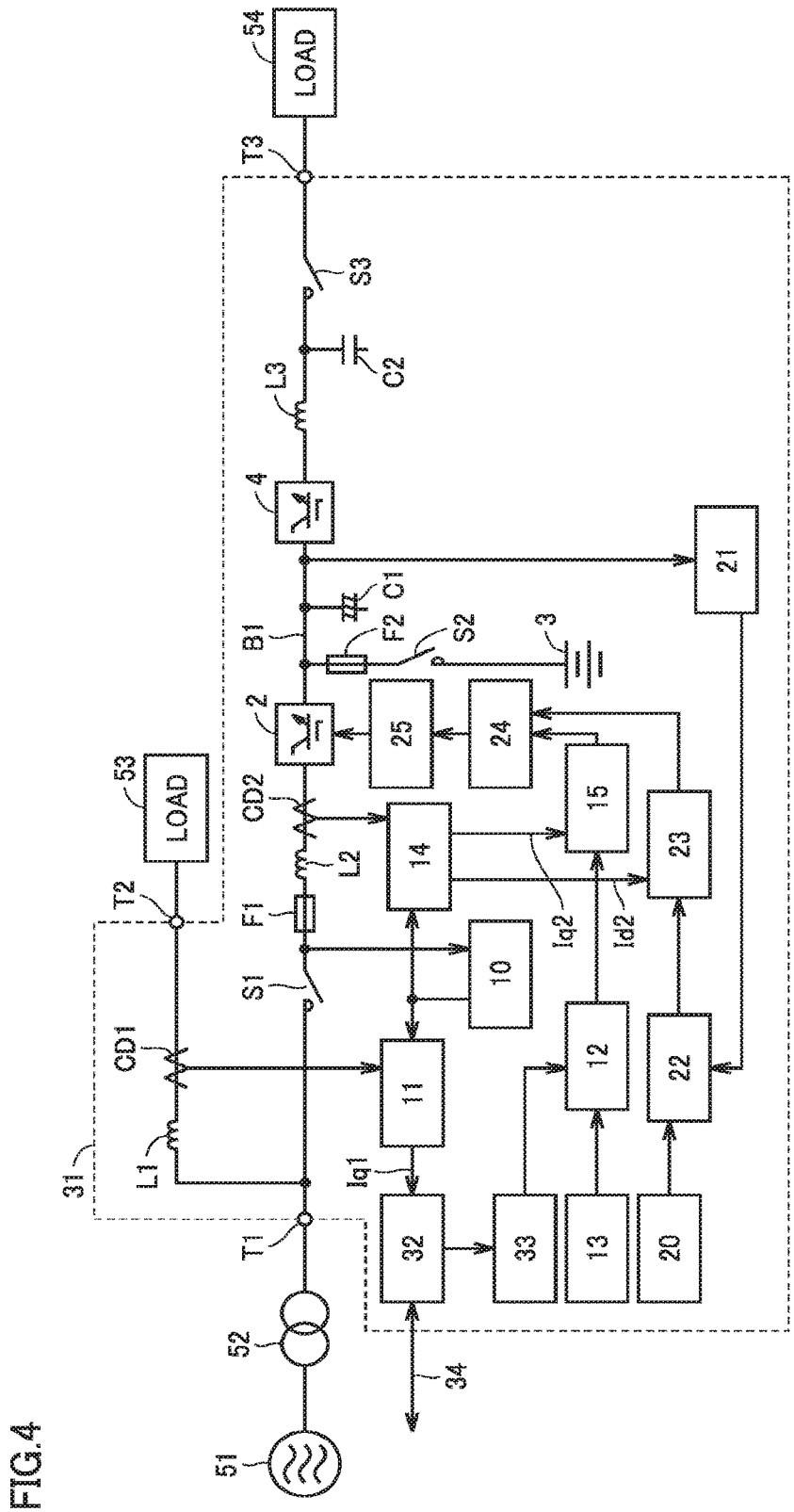
FIG. 4 is a circuit block diagram showing a configuration of an uninterruptible power supply 31 shown in FIG. 3.

FIG. 4 is a circuit block diagram showing a configuration of uninterruptible power supply 31, FIG. 4 being contrasted with FIG. 1. With reference to FIG. 4, uninterruptible power supply 31 is different from uninterruptible power supply 1 in that the former additionally includes a communication unit 32 and a sharing current calculation unit 33.

Communication unit 32 exchanges various types of information with each of a plurality of uninterruptible power supplies 31A through communication line 34. In particular, communication unit 32 sends a signal representing that uninterruptible power supply 31 is in operation and sends the value of q-axis current Iq1 generated at coordinate transformer 11, to each uninterruptible power supply 31A, and receives, from each uninterruptible power supply 31A, a signal representing whether the uninterruptible power supply 31A is in operation.

Sharing current calculation unit 33 acquires the number n of uninterruptible power supplies in operation among uninterruptible power supply 31 and a plurality of uninterruptible power supplies 31A, based on a signal from each uninterruptible power supply 31 or 31A representing whether the uninterruptible power supply 31 or 31A is in operation. Further, sharing current calculation unit 33 acquires a sharing current Iq1/n by dividing q-axis current Iq1, which is provided from coordinate transformer 11 through communication unit 32, by the number n of uninterruptible power supplies in operation, and provides the sharing current Iq1/n to reactive current instructing unit 12. Note that n is an integer of 1 or more.

Reactive current instructing unit 12 generates a reactive current instruction value (q-axis current instruction value) for compensating a reactive current generated at load 53, based on sharing current Iq1 in provided from sharing current calculation unit 33. Limiter 13 limits the reactive current instruction value output from reactive current instructing unit 12 to an upper limit value or less. The reactive current instruction value limited to the upper limit value or less is provided to current controller 15.

Figure 5:
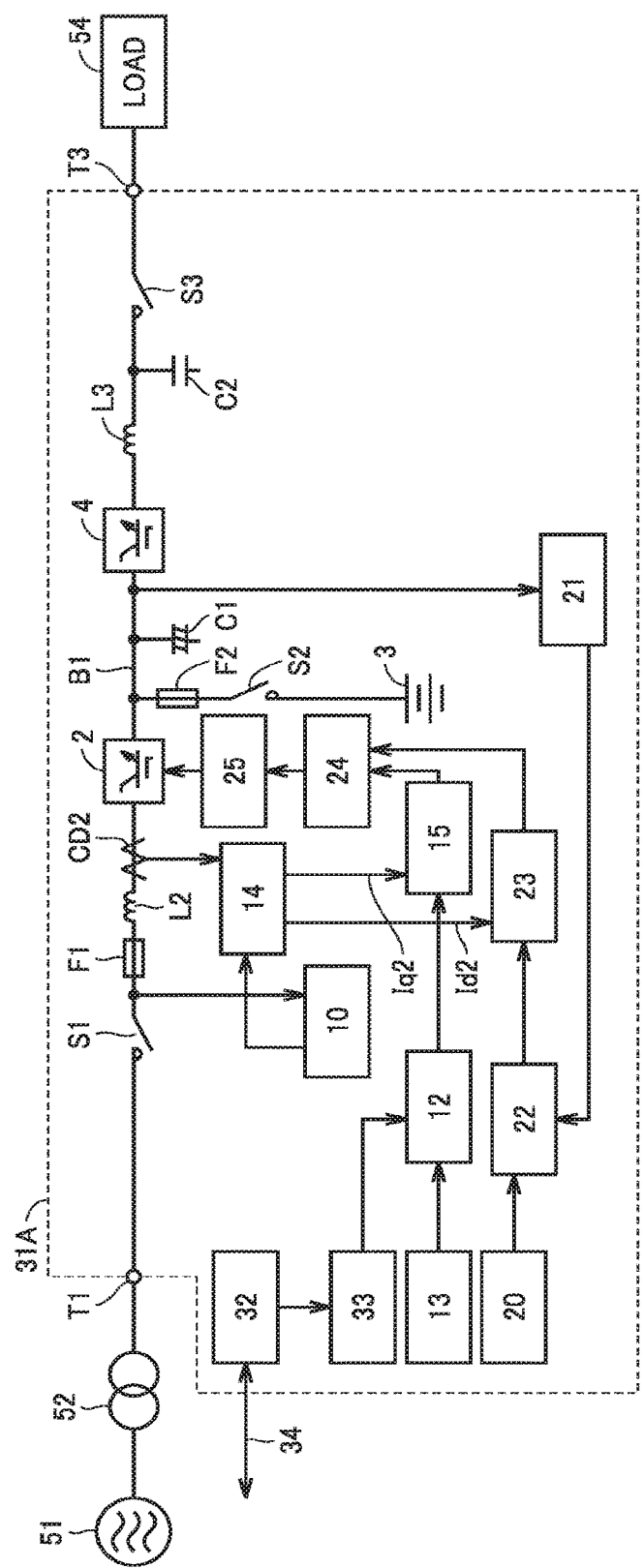
FIG. 5 is a circuit block diagram showing a configuration of an uninterruptible power supply 31A shown in FIG. 3.

FIG. 5 is a circuit block diagram showing a configuration of uninterruptible power supply 31A, FIG. 5 being contrasted with FIG. 4. With reference to FIG. 5, uninterruptible power supply 31A is different from uninterruptible power supply 31 in that the former is not provided with output terminal T2, reactor L1, current detector CD1, and coordinate transformer 11.

Communication unit 32 exchanges various types of information with each of other uninterruptible power supplies 31 or 31A through communication line 34. In particular, communication unit 32 sends a signal representing that this uninterruptible power supply 31A is in operation, to each uninterruptible power supply 31 or 31A, receives the value of q-axis current Iq1 from uninterruptible power supply 31, and receives, from each uninterruptible power supply 31 or 31A, a signal representing whether the uninterruptible power supply 31 or 31A is in operation.

Sharing current calculation unit 33 acquires the number n of uninterruptible power supplies in operation among uninterruptible power supply 31 and a plurality of uninterruptible power supplies 31A, based on a signal from each uninterruptible power supply 31 or 31A representing whether the uninterruptible power supply 31 or 31A is in operation. Further, sharing current calculation unit 33 acquires sharing current Iq1/n by dividing q-axis current Iq1, which is provided from uninterruptible power supply 31 through communication unit 32, by the number n of uninterruptible power supplies in operation, and provides the sharing current Iq1/n to reactive current instructing unit 12.

Reactive current instructing unit 12 generates a reactive current instruction value (q-axis current instruction value) for compensating a reactive current generated at load 53, based on sharing current Iq1/n provided from sharing current calculation unit 33. Limiter 13 limits the reactive current instruction value output from reactive current instructing unit 12 to an upper limit value or less. The reactive current instruction value limited to the upper limit value or less is provided to current controller 15. The other features and operations of each uninterruptible power supply 31, 31A are the same as those of uninterruptible power supply 1 of FIG. 1, and thus the explanations for them are not repeated.

With Embodiment 2, the same advantageous effects as those of Embodiment 1 can be obtained. In addition, since reactive power generated at load 53 is compensated by n uninterruptible power supplies in operation, a larger reactive power can be compensated than in Embodiment 1.

Note that, in a case where reactive power generated at load 53 cannot be compensated by n uninterruptible power supplies in operation, uninterruptible power supply 31A that has been stopped and that is ready for operation may be activated so as to increase the number n of operating uninterruptible power supplies.

[Embodiment 3]

Figure 6:
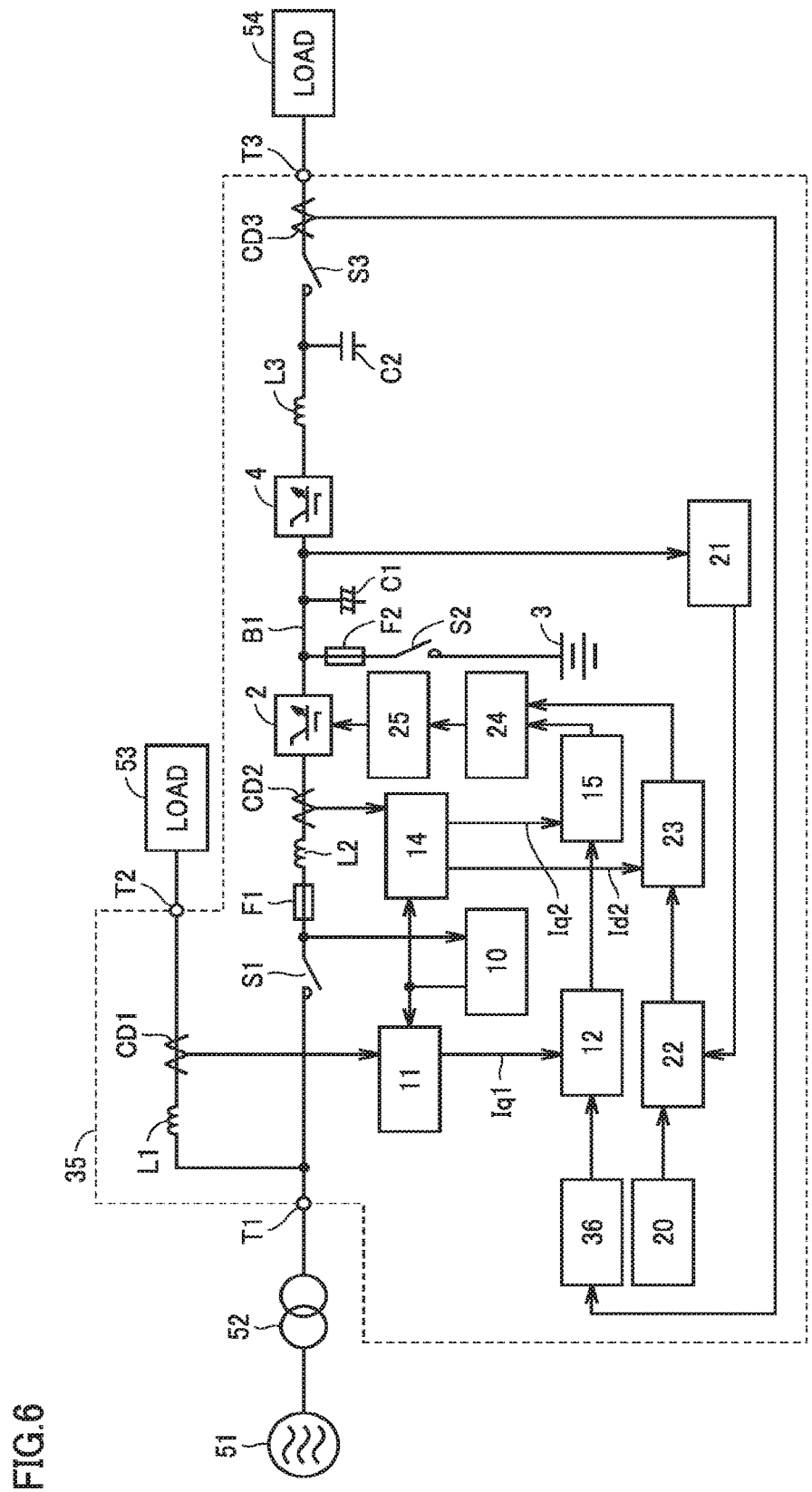
FIG. 6 is a circuit block diagram showing a configuration of an uninterruptible power supply according to Embodiment 3 of the present invention.

FIG. 6 is a circuit block diagram showing a configuration of an uninterruptible power supply 35 according to Embodiment 3 of the present invention, FIG. 6 being contrasted with FIG. 1. With reference to FIG. 6, uninterruptible power supply 35 is different from uninterruptible power supply 1 of FIG. 1 in that the former additionally includes a current detector CD3 and includes a limiter 36 instead of limiter 13.

Current detector CD3 detects an instantaneous value of an AC current flowing between the other terminal of switch S3 and output terminal T3, and outputs a signal representing the detection value to limiter 36. Actually, there are three current detectors CD3 corresponding to a three-phase AC current. Each of three current detectors CD3 detects an instantaneous value of a three-phase AC current and outputs a signal representing the detection value to limiter 36. Limiter 36 limits a reactive current instruction value generated by reactive current instructing unit 12 to an upper limit value or less. The upper limit value is the difference between the rated current of uninterruptible power supply 35 and a three-phase AC current (load current) detected by three current detectors CD3. The other features and operations are the same as those of uninterruptible power supply 1 of FIG. 1, and thus the explanations for them are not repeated.

With Embodiment 3, the same advantageous effects as those of Embodiment 1 can be obtained. In addition, if load 54 is changed and a current flowing through load 54 is changed, a reactive current generated at load 53 can be compensated within the range of rated current of uninterruptible power supply 35.

Note that, in Embodiment 3, although a reactive current generated at converter 2 is limited to an upper limit value or less, the upper limit value being a value according to the difference between the rated current of uninterruptible power supply 35 and a current supplied to load 54, reactive power generated at converter 2 may be limited to an upper limit value or less, the upper limit value being a value according to the difference between the rated capacity of uninterruptible power supply 35 and AC power supplied to load 54.

[Embodiment 4]

Figure 7:
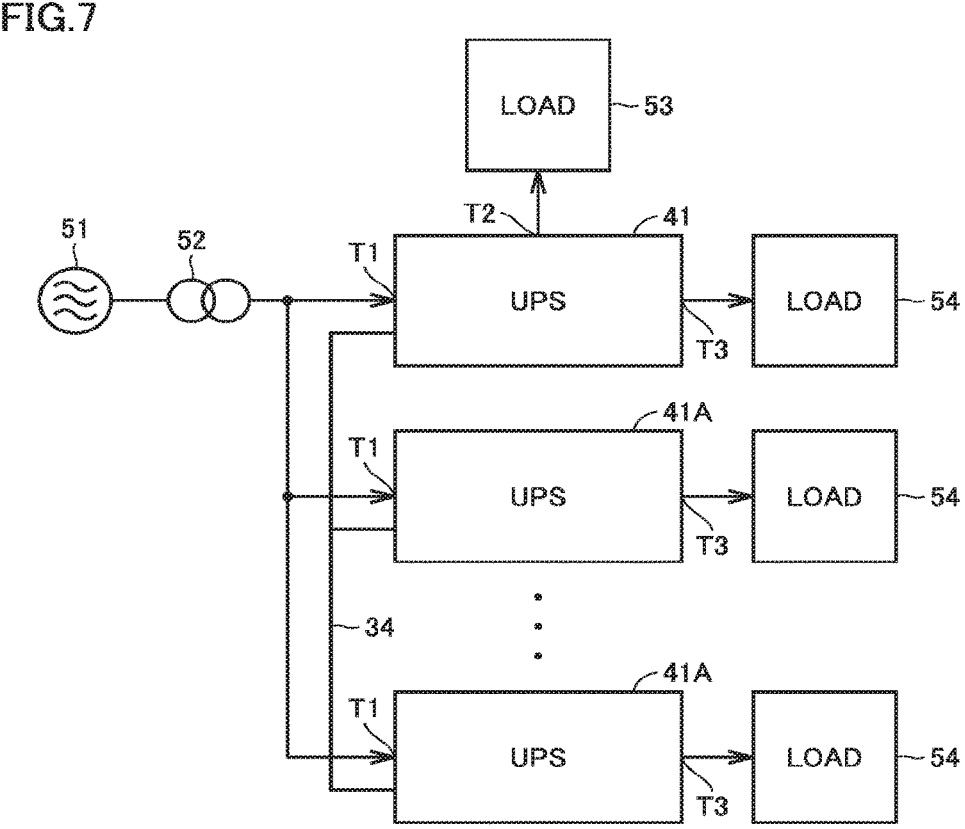
FIG. 7 is a circuit block diagram showing a configuration of an uninterruptible power supply system according to Embodiment 4 of the present invention.

FIG. 7 is a block diagram showing a configuration of an uninterruptible power supply system according to Embodiment 4 of the present invention, FIG. 7 being contrasted with FIG. 3. In FIG. 7, the uninterruptible power supply system includes an uninterruptible power supply 41 and a plurality of uninterruptible power supplies 41A. Each of uninterruptible power supply 41 and a plurality of uninterruptible power supplies 41A receives, together with load 53, AC power supplied from commercial AC power source 51 through transformer 52 and supplies AC power to load 54.

Uninterruptible power supply 41 and a plurality of uninterruptible power supplies 41A are coupled to one another with communication line 34, and each uninterruptible power supply exchanges various types of information with each of other uninterruptible power supplies through communication line 34. Uninterruptible power supply 41 and a plurality of uninterruptible power supplies 41A compensate reactive power generated at load 53 in cooperation with one another.

Figure 8:
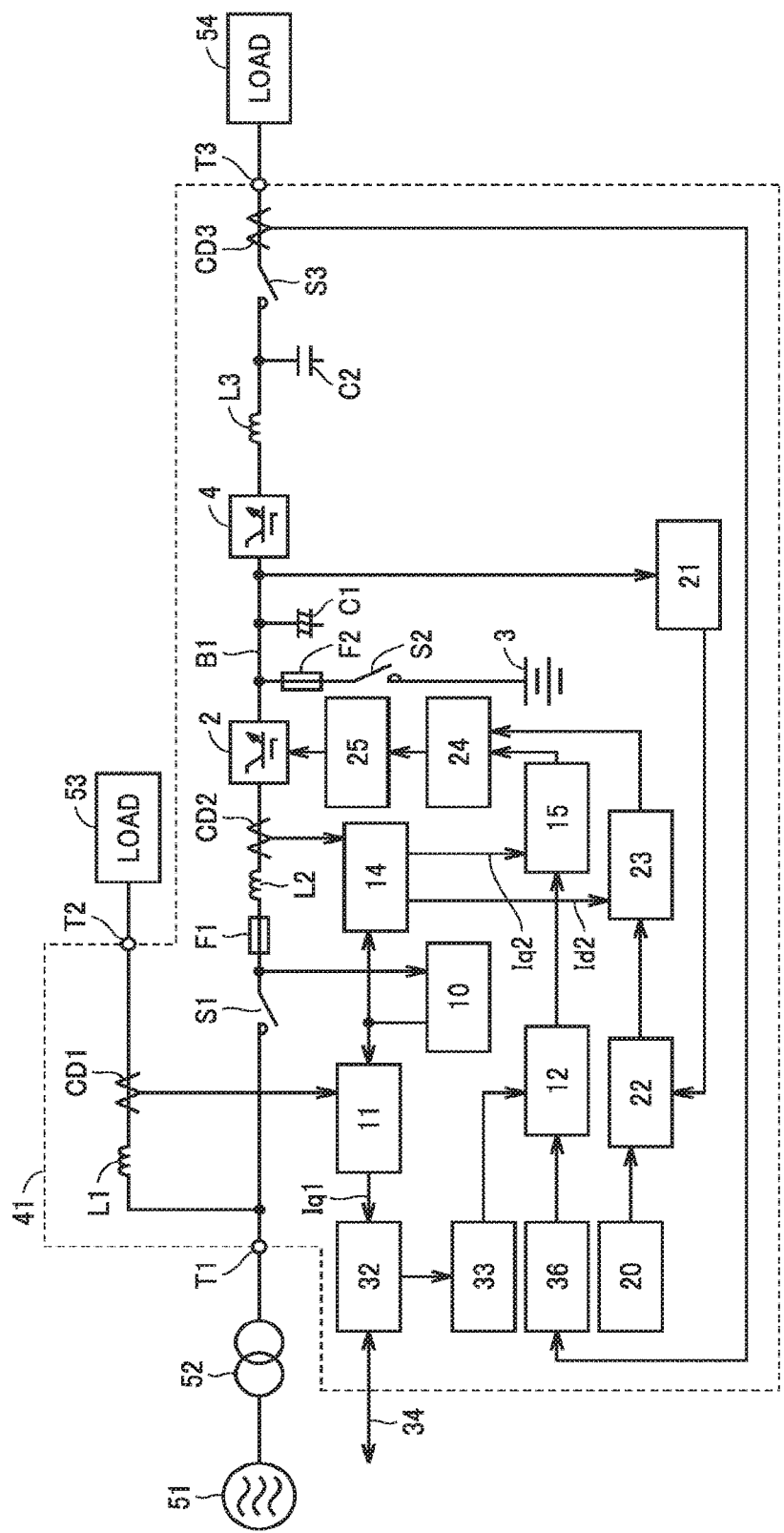
FIG. 8 is a circuit block diagram showing a configuration of an uninterruptible power supply 41 shown in FIG. 7.

FIG. 8 is a circuit block diagram showing a configuration of uninterruptible power supply 41, FIG. 8 being contrasted with FIG. 6. With reference to FIG. 8, uninterruptible power supply 41 is different from uninterruptible power supply 35 of FIG. 6 in that the former additionally includes communication unit 32 and sharing current calculation unit 33.

Communication unit 32 exchanges various types of information with each of a plurality of uninterruptible power supplies 41A through communication line 34. In particular, communication unit 32 sends a signal representing that uninterruptible power supply 41 is in operation and sends the value of q-axis current Iq1 generated at coordinate transformer 11, to each uninterruptible power supply 41A, and receives, from each uninterruptible power supply 41A, a signal representing whether the uninterruptible power supply 41A is in operation.

Sharing current calculation unit 33 acquires the number n of uninterruptible power supplies in operation among uninterruptible power supply 41 and a plurality of uninterruptible power supplies 41A, based on a signal from each uninterruptible power supply 41 or 41A representing whether the uninterruptible power supply 41 or 41A is in operation. Further, sharing current calculation unit 33 acquires sharing current Iq1/n by dividing q-axis current Iq1, which is provided from coordinate transformer 11 through communication unit 32, by the number n of uninterruptible power supplies in operation, and provides the sharing current Iq1/n to reactive current instructing unit 12. Note that n is an integer of 1 or more.

Reactive current instructing unit 12 generates a reactive current instruction value (q-axis current instruction value) for compensating a reactive current generated at load 53, based on sharing current Iq1/n provided from sharing current calculation unit 33. Limiter 36 limits the reactive current instruction value output from reactive current instructing unit 12 to an upper limit value or less. The reactive current instruction value limited to the upper limit value or less is provided to current controller 15.

Figure 9:
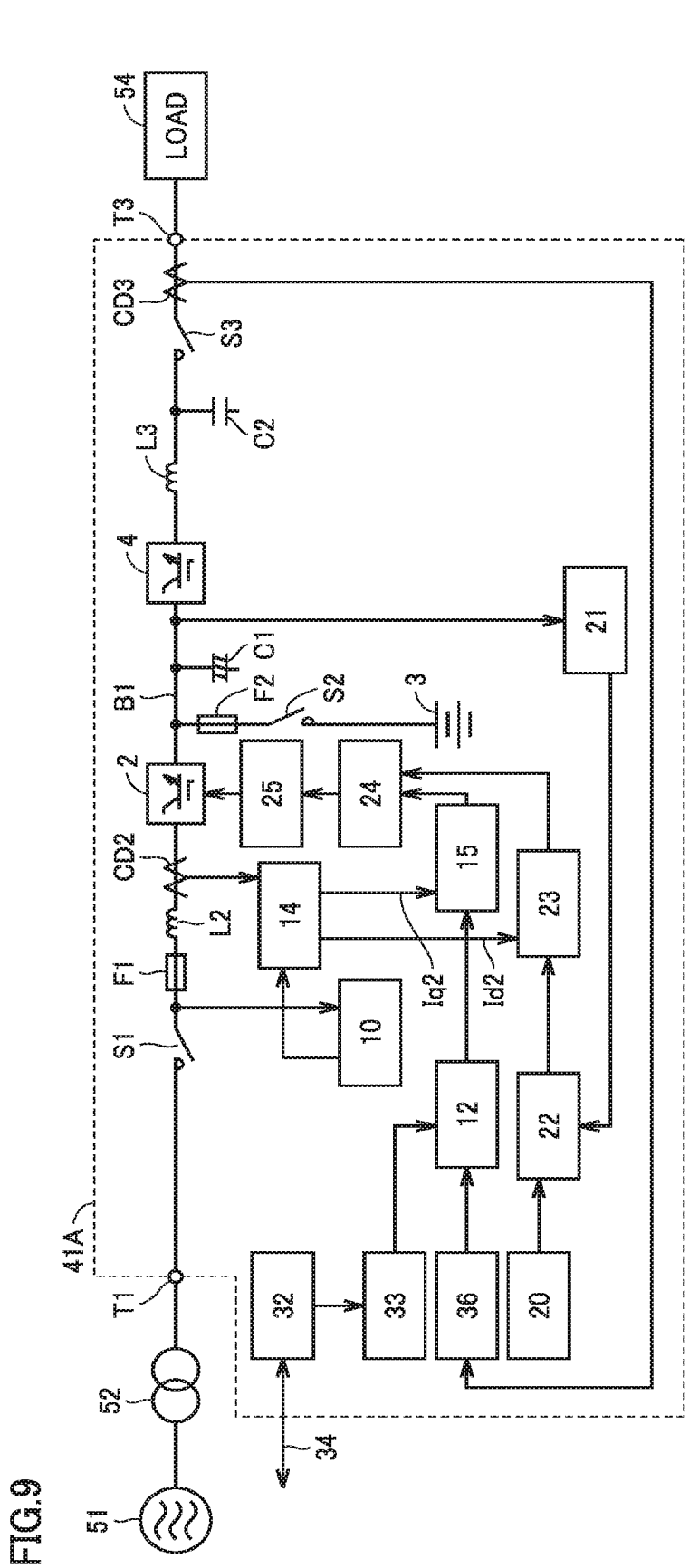
FIG. 9 is a circuit block diagram showing a configuration of an uninterruptible power supply 41A shown in FIG. 7.

FIG. 9 is a circuit block diagram showing a configuration of uninterruptible power supply 41A, FIG. 9 being contrasted with FIG. 8. With reference to FIG. 9, uninterruptible power supply 41A is different from uninterruptible power supply 41 in that the former is not provided with output terminal T2, reactor L1, current detector CD1, and coordinate transformer 11.

Communication unit 32 exchanges various types of information with each of other uninterruptible power supplies 41 or 41A through communication line 34. In particular, communication unit 32 sends a signal representing that the uninterruptible power supply 41A is in operation, to each uninterruptible power supply 41 or 41A, receives the value of q-axis current Iq1 from uninterruptible power supply 41, and receives, from each uninterruptible power supply 41 or 41A, a signal representing whether the uninterruptible power supply 41 or 41A is in operation.

Sharing current calculation unit 33 acquires the number n of uninterruptible power supplies in operation among uninterruptible power supply 41 and a plurality of uninterruptible power supplies 41A, based on a signal from each uninterruptible power supply 41 or 41A representing whether the uninterruptible power supply 41 or 41A is in operation. Further, sharing current calculation unit 33 acquires sharing current Iq1/n by dividing q-axis current Iq1, which is provided from uninterruptible power supply 41 through communication unit 32, by the number n of uninterruptible power supplies in operation, and provides the sharing current Iq1/n to reactive current instructing unit 12.

Reactive current instructing unit 12 generates a reactive current instruction value (q-axis current instruction value) for compensating a reactive current generated at load 53, based on sharing current Iq1/n provided from sharing current calculation unit 33. Limiter 13 limits the reactive current instruction value output from reactive current instructing unit 12 to an upper limit value or less. The reactive current instruction value limited to the upper limit value or less is provided to current controller 15. The other features and operations of each uninterruptible power supply 41, 41A are the same as those of uninterruptible power supply 1 of FIG. 1, and thus the explanations for them are not repeated.

With Embodiment 4, the same advantageous effects as those of Embodiment 3 can be obtained. In addition, since reactive power generated at load 53 can be compensated by n uninterruptible power supplies in operation, a larger reactive power can be compensated than in Embodiment 3.

Note that, in a case where reactive power generated at load 53 cannot be compensated by n uninterruptible power supplies in operation, uninterruptible power supply 41A that has been stopped and that is ready for operation may be activated so as to increase the number n of operating uninterruptible power supplies.

[Embodiment 5]

Figure 10:
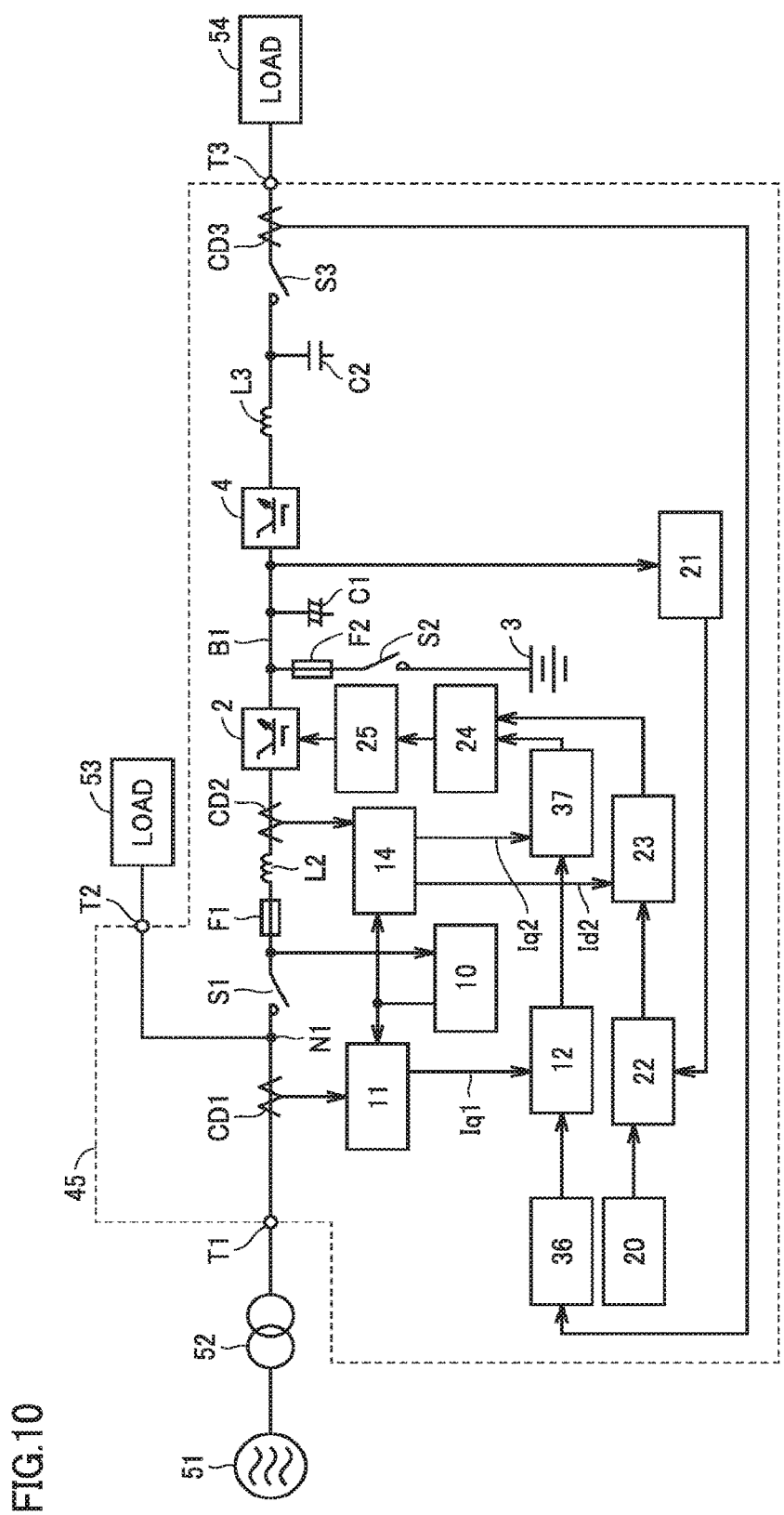
FIG. 10 is a circuit block diagram showing a configuration of an uninterruptible power supply according to Embodiment 5 of the present invention.

FIG. 10 is a circuit block diagram showing a configuration of an uninterruptible power supply 45 according to Embodiment 5 of the present invention, FIG. 10 being contrasted with FIG. 6. With reference to FIG. 10, uninterruptible power supply 45 is different from uninterruptible power supply 35 of FIG. 6 in that the former is not provided with reactor L1, locates current detector CD1 in a different position, and includes a current controller 37 instead of current controller 15.

Output terminal T2 is connected to a node N1 between input terminal T1 and one terminal of switch S1. Current detector CD1 detects an instantaneous value of an AC current flowing between input terminal T1 and node N1, and outputs a signal representing the detection value to coordinate transformer 11. Actually, three current detectors CD1 are provided corresponding to a three-phase AC current.

Each of three current detectors CD1 detects an instantaneous value of a three-phase AC current, and outputs a signal representing the detection value to coordinate transformer 11. Coordinate transformer 11 performs three-phase to two-phase transformation of the three-phase AC current detected by three current detectors CD1 and generates d-axis current and q-axis current Iq1. The q-axis current Iq1 is a DC signal of a value according to a reactive current acquired by adding a reactive current generated at load 53 to a reactive current generated at converter 2.

Reactive current instructing unit 12 generates a reactive current instruction value (q-axis current instruction value) for compensating a reactive current generated at load 53 and converter 2, based on q-axis current Iq1 generated by coordinate transformer 11. Limiter 36 limits the reactive current instruction value output from reactive current instructing unit 12 to an upper limit value or less. The upper limit value is a value acquired by converting the current value of the difference between the rated current of uninterruptible power supply 45 and a detection value from current detector CD3, into a DC signal (q-axis current). The reactive current instruction value limited to the upper limit value or less is provided to current controller 37.

Current controller 37 generates a voltage instruction value for reducing the reactive current instruction value, based on the reactive current instruction value from reactive current instructing unit 12 and q-axis current Iq2 from coordinate transformer 14. Reduction in reactive current instruction value leads to reduction in reactive current detected by current detector CD1, and thus leads to improvement in power factor of the electrical equipment on the input terminal T1 side relative to transformer 52. When the reactive current instruction value is 0, the reactive current detected by current detector CD1 is 0 A and the power factor of the electrical equipment on the input terminal T1 side relative to transformer 52 is 1.

Next, the operation of uninterruptible power supply 45 is described. In an initial state, AC power is supplied from commercial AC power source 51 through transformer 52 to load 53 so as to operate load 53, and the operation of converter 2 is stopped.

A three-phase AC current flowing from transformer 52 to load 53 is detected by three current detectors CD1, and the detection values are each subjected to coordinate transformation by phase detector 10 and coordinate transformer 11, so that q-axis current Iq1 is generated. The q-axis current Iq1 is transformed into a reactive current instruction value by reactive current instructing unit 12. The reactive current instruction value is limited to an upper limit value or less by limiter 36. The upper limit value at this time is a value according to the rated current of uninterruptible power supply 45 since an AC current has not yet been supplied to load 54. Since the operation of converter 2 is stopped, the detection value from current detector CD2 is 0 A and q-axis current Iq2 is 0.

Then, the operation of converter 2 and inverter 4 is started, and supply of AC power to load 54 is started. A reactive current generated at load 53 and converter 2 is transformed into q-axis current Iq1 by current detector CD1, phase detector 10, and coordinate transformer 11, and is further transformed into a reactive current instruction value by reactive current instructing unit 12 and limiter 36. A reactive current generated at converter 2 is transformed into q-axis current Iq2 by current detector CD2, phase detector 10, and coordinate transformer 14.

Current controller 37 generates a voltage instruction value based on the reactive current instruction value and q-axis current Iq2 and controls q-axis current Iq2 so as to reduce the reactive current instruction value. That is, I1=−I2+I53 is true, where T1 denotes a reactive current flowing through current detector CD1, −I2 denotes a reactive current flowing through current detector CD2 (a reactive current generated at converter 2), and I53 denotes a reactive current generated at load 53. Current controller 37 controls I2 so as to reduce T1 to 0 A. The equation I2=I53 is true when I1=0. The other features and operations are the same as those of uninterruptible power supply 35 of FIG. 6, and thus the explanations for them are not repeated.

With Embodiment 5, the same advantageous effects as those of Embodiment 3 can be obtained. In addition, reactive power generated at load 53 and converter 2 can be compensated within the range of rated capacity of uninterruptible power supply 45.

[Embodiment 6]

Figure 11:
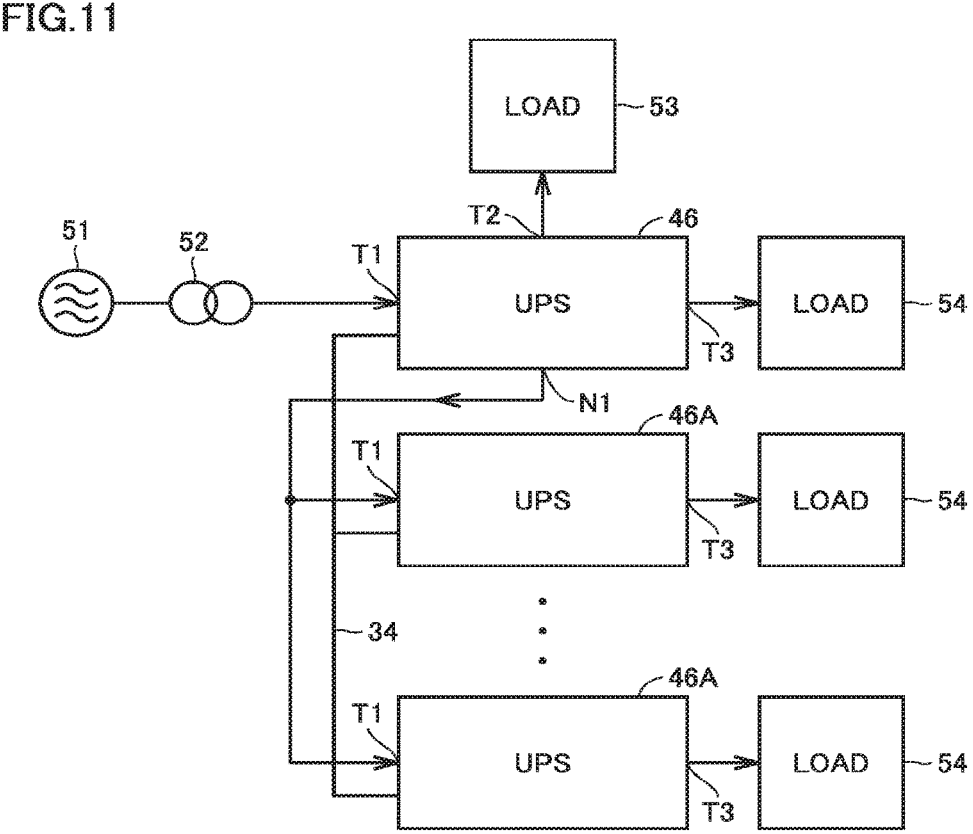
FIG. 11 is a circuit block diagram showing a configuration of an uninterruptible power supply system according to Embodiment 6 of the present invention.

FIG. 11 is a block diagram showing a configuration of an uninterruptible power supply system according to Embodiment 6 of the present invention, FIG. 11 being contrasted with FIG. 3. In FIG. 11, the uninterruptible power supply system includes an uninterruptible power supply 46 and a plurality of uninterruptible power supplies 46A. Each of uninterruptible power supply 46 and a plurality of uninterruptible power supplies 46A receives, together with load 53, AC power supplied from commercial AC power source 51 through transformer 52 and supplies AC power to load 54.

Uninterruptible power supply 46 and a plurality of uninterruptible power supplies 46A are coupled to one another with communication line 34, and each uninterruptible power supply exchanges various types of information with each of other uninterruptible power supplies through communication line 34. Uninterruptible power supply 46 and a plurality of uninterruptible power supplies 46A compensate reactive power generated at load 53 in cooperation with one another.

Figure 12:
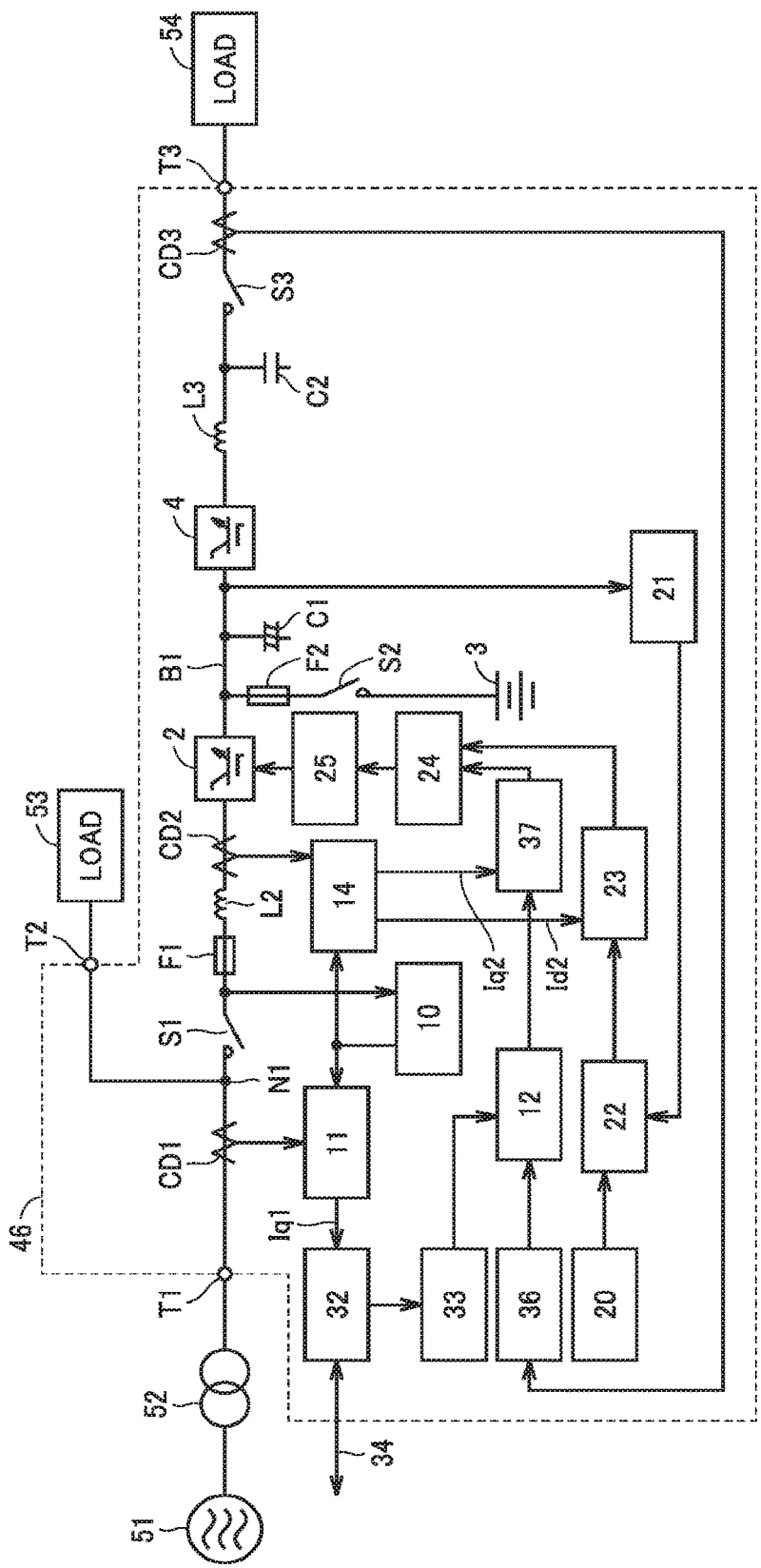
FIG. 12 is a circuit block diagram showing a configuration of an uninterruptible power supply 46 shown in FIG. 11.

FIG. 12 is a circuit block diagram showing a configuration of uninterruptible power supply 46, FIG. 12 being contrasted with FIG. 10. With reference to FIG. 12, uninterruptible power supply 46 is different from uninterruptible power supply 45 in that the former additionally includes communication unit 32 and sharing current calculation unit 33.

Communication unit 32 exchanges various types of information with each of a plurality of uninterruptible power supplies 46A through communication line 34. In particular, communication unit 32 sends a signal representing that uninterruptible power supply 46 is in operation and sends the value of q-axis current Iq1 generated at coordinate transformer 11, to each uninterruptible power supply 46A, and receives, from each uninterruptible power supply 46A, a signal representing whether the uninterruptible power supply 46A is in operation.

Sharing current calculation unit 33 acquires the number n of uninterruptible power supplies in operation among uninterruptible power supply 46 and a plurality of uninterruptible power supplies 46A, based on a signal from each uninterruptible power supply 46 or 46A representing whether the uninterruptible power supply 46 or 46A is in operation. Further, sharing current calculation unit 33 acquires sharing current Iq1/n by dividing q-axis current Iq1, which is provided from coordinate transformer 11 through communication unit 32, by the number n of uninterruptible power supplies in operation, and provides the sharing current Iq1/n to reactive current instructing unit 12. Note that n is an integer of 1 or more.

Reactive current instructing unit 12 generates a reactive current instruction value (q-axis current instruction value) for compensating a reactive current generated at load 53, based on sharing current Iq1/n provided from sharing current calculation unit 33. Limiter 36 limits the reactive current instruction value output from reactive current instructing unit 12 to an upper limit value or less. The reactive current instruction value limited to the upper limit value or less is provided to current controller 37. Current controller 37 controls q-axis current Iq2 so as to reduce the reactive current instruction value.

Figure 13:
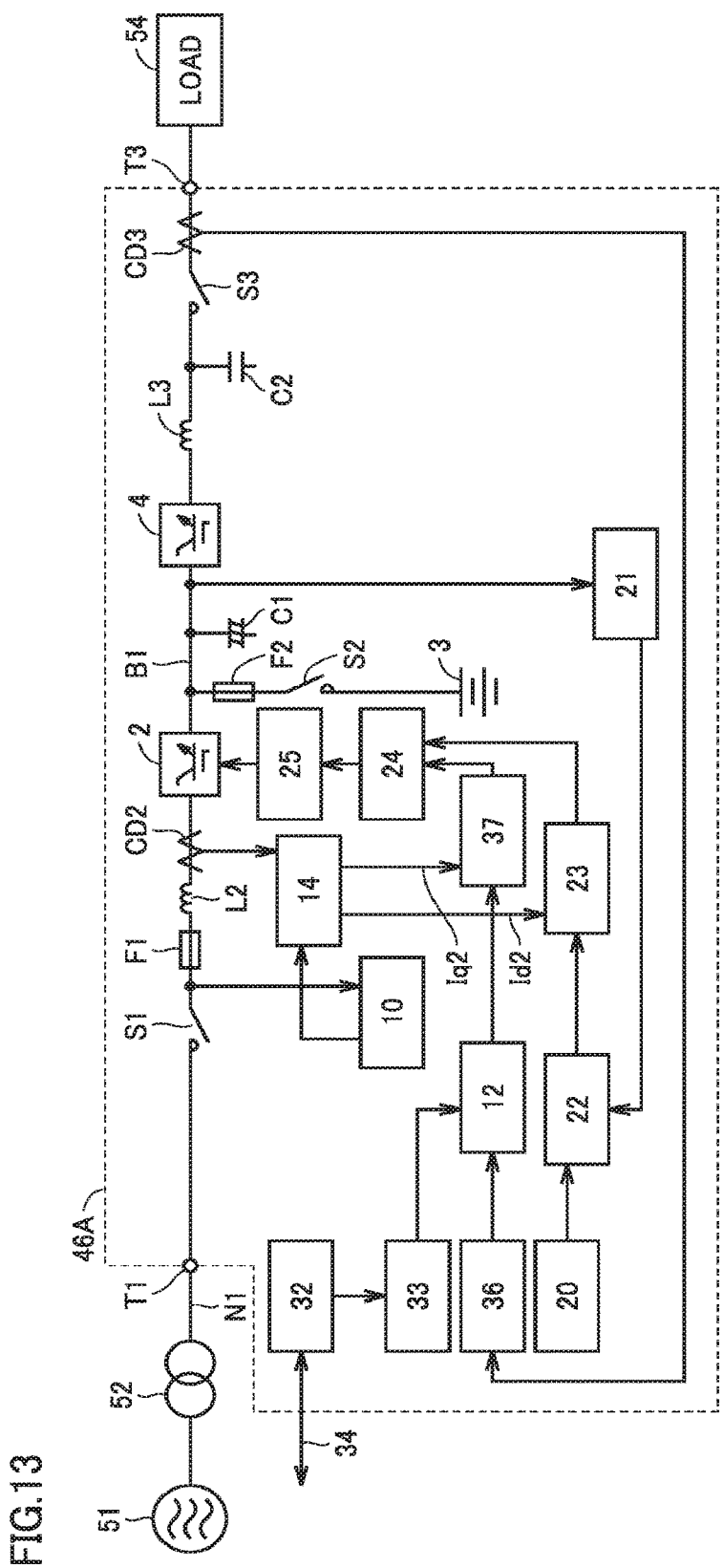
FIG. 13 is a circuit block diagram showing a configuration of an uninterruptible power supply 46A shown in FIG. 11.

FIG. 13 is a circuit block diagram showing a configuration of uninterruptible power supply 46A, FIG. 13 being contrasted with FIG. 12. With reference to FIG. 13, uninterruptible power supply 46A is different from uninterruptible power supply 46 in that the former has input terminal T1 connected to node N1 of uninterruptible power supply 46 and is not provided with output terminal T2, current detector CD1, and coordinate transformer 11.

Since input terminal T1 is connected to node N1 of uninterruptible power supply 46, current detector CD1 of uninterruptible power supply 46 detects the sum of AC current supplied from commercial AC power source 51 through transformer 52 to load 53, uninterruptible power supply 46, and a plurality of uninterruptible power supplies 46A.

Communication unit 32 exchanges various types of information with each of other uninterruptible power supplies 46 or 46A through communication line 34. In particular, communication unit 32 sends a signal representing that the uninterruptible power supply 46A is in operation, to each uninterruptible power supply 46 or 46A, receives the value of q-axis current Iq1 from uninterruptible power supply 46, and receives, from each uninterruptible power supply 46 or 46A, a signal representing whether the uninterruptible power supply 46 or 46A is in operation.

Sharing current calculation unit 33 acquires the number n of uninterruptible power supplies in operation among uninterruptible power supply 46 and a plurality of uninterruptible power supplies 46A, based on a signal from each uninterruptible power supply 46 or 46A representing whether the uninterruptible power supply 46 or 46A is in operation. Further, sharing current calculation unit 33 acquires sharing current Iq1/n by dividing q-axis current Iq1, which is provided from uninterruptible power supply 46 through communication unit 32, by the number n of uninterruptible power supplies in operation, and provides the sharing current Iq1/n to reactive current instructing unit 12.

Reactive current instructing unit 12 generates a reactive current instruction value (q-axis current instruction value) for compensating a reactive current generated at load 53, based on sharing current Iq1/n provided from sharing current calculation unit 33. Limiter 36 limits the reactive current instruction value output from reactive current instructing unit 12 to an upper limit value or less. The reactive current instruction value limited to the upper limit value or less is provided to current controller 37. The other features and operations of each uninterruptible power supply 46, 46A are the same as those of uninterruptible power supply 45 of FIG. 10, and thus the explanations for them are not repeated.

With Embodiment 6, the same advantageous effects as those of Embodiment 5 can be obtained. In addition, since reactive power generated at load 53 is compensated by n uninterruptible power supplies in operation, a larger reactive power can be compensated than in Embodiment 5.

Note that, in a case where reactive power generated at load 53 cannot be compensated by n uninterruptible power supplies in operation, uninterruptible power supply 46A that has been stopped and that is ready for operation may be activated so as to increase the number n of operating uninterruptible power supplies.

Further, it is needless to say that Embodiments 1 to 6 described above can be combined with one another as appropriate.

The embodiments disclosed herein should be considered illustrative in all respects, not limitative. It is intended that the scope of the present invention is defined not by the above description but by the claims, and that the scope of the invention includes all the modifications in the meaning and scope equivalent to the claims.

REFERENCE SIGNS LIST 1, 31, 31A, 35, 41, 41A, 45, 46, 46A: uninterruptible power supply; T1: input terminal; T2, T3: output terminal;

L1 to L3: reactor; CD1 to CD3: current detector; S1 to S3: switch; F1, F2: fuse; 2: converter; B1: DC bus; 3: battery; C1, C2: capacitor; 4: inverter; 10: phase detector; 11, 14: coordinate transformer; 12: reactive current instructing unit; 13, 36: limiter; 15, 23, 37: current controller; 20: DC voltage instructing unit; 21: voltage detector; 22: voltage controller; 24: voltage vector calculating unit; 25: PWM controller; 32: communication unit; 33: sharing current calculation unit; 34: communication line; 51: commercial AC power source; 52: transformer; 53, 54: load

The invention claimed is:

1. An uninterruptible power supply configured to receive, together with a first load, AC power supplied from an AC power source, the uninterruptible power supply comprising:
a converter configured to convert AC power from the AC power source into DC power;
an inverter configured to convert DC power generated by the converter or DC power in a power storage device into AC power to supply the converted power to a second load;
a controller configured to control reactive power generated at the converter to compensate at least a part of reactive power generated at the first load; and
a limiter configured to limit reactive power generated at the converter to upper limit power or lower,
the upper limit power being set to a value according to a difference between a rated capacity of the uninterruptible power supply and AC power supplied to the second load.

2. The uninterruptible power supply according to claim 1, further comprising:
a first detector configured to detect a first reactive current supplied from the AC power source to the first load;
a second detector configured to detect a second reactive current supplied from the AC power source to the converter; and
a reactive current instructing unit configured to generate, based on a detection result from the first detector, a reactive current instruction value for compensating the first reactive current, wherein
the limiter is configured to limit the reactive current instruction value to an upper limit value or less,
the upper limit value is set to a value according to a difference between a rated current of the uninterruptible power supply and an AC current supplied to the second load, and
the controller is configured to control the converter based on a detection result from the second detector and the reactive current instruction value limited by the limiter, and compensate at least a part of the first reactive current by the second reactive current.

3. The uninterruptible power supply according to claim 2, wherein the upper limit value is set to a value according to a difference between the rated current of the uninterruptible power supply and a rated current of the second load.

4. The uninterruptible power supply according to claim 2, further comprising a current detector configured to detect an AC current supplied from the inverter to the second load, wherein
the upper limit value is set to a value according to a difference between the rated current of the uninterruptible power supply and a detection value from the current detector.

5. The uninterruptible power supply according to claim 2, wherein
the first detector includes:
a first three-phase reactor having one terminal configured to receive a three-phase AC current supplied from the AC power source, and having the other terminal connected to the first load;
a first current detector configured to detect an instantaneous value of a three-phase AC current flowing from the other terminal of the first three-phase reactor to the first load;
a phase detector configured to detect a phase of a three-phase AC voltage supplied from the AC power source; and
a first coordinate transformer configured to perform, based on a detection value from the phase detector, coordinate transformation of a three-phase AC current detected by the first current detector, and generate a first q-axis current having a value according to the first reactive current,
the second detector includes:
a second three-phase reactor having one terminal configured to receive a three-phase AC current supplied from the AC power source, and having the other terminal connected to the converter;
a second current detector configured to detect an instantaneous value of a three-phase AC current flowing from the other terminal of the second three-phase reactor to the converter; and
a second coordinate transformer configured to perform, based on a detection value from the phase detector, coordinate transformation of a three-phase AC current detected by the second current detector, and generate a second q-axis current having a value according to the second reactive current,
the reactive current instructing unit is configured to generate the reactive current instruction value based on the first q-axis current, and
the controller is configured to control the converter so that the second q-axis current matches the reactive current instruction value limited by the limiter.

6. The uninterruptible power supply according to claim 5, further comprising:
a voltage detector configured to detect a DC voltage supplied from the converter to the inverter; and
an active current instructing unit configured to generate an active current instruction value so that a detection value from the voltage detector matches a target DC voltage, wherein
the second coordinate transformer is further configured to generate a d-axis current having a value according to an active current supplied from the AC power source to the converter, and
the controller is further configured to control the converter so that the d-axis current matches the active current instruction value.

7. The uninterruptible power supply according to claim 2, wherein
the converter, the inverter, the controller, the limiter, the second detector, and the reactive current instructing unit constitute an uninterruptible power supply unit,
the uninterruptible power supply comprises a plurality of uninterruptible power supply units,
the first detector is provided to be shared by the plurality of uninterruptible power supply units,
the reactive current instructing unit of each of the uninterruptible power supply units is configured to generate the reactive current instruction value based on a value acquired by dividing a detection value from the first detector by the number of uninterruptible power supply units in operation among the plurality of uninterruptible power supply units.

8. The uninterruptible power supply according to claim 1, further comprising:
a first detector configured to detect a first reactive current supplied from the AC power source to the first load and the converter;
a second detector configured to detect a second reactive current supplied from the AC power source to the converter; and
a reactive current instructing unit configured to generate, based on a detection value from the first detector, a reactive current instruction value for compensating the first reactive current, wherein
the limiter is configured to limit the reactive current instruction value to an upper limit value or less,
the upper limit value is set to a value according to a difference between a rated current of the uninterruptible power supply unit and an AC current supplied to the second load, and
the controller is configured to control the converter based on a detection result from the second detector and the reactive current instruction value limited by the limiter, and control the second reactive current to reduce the first reactive current.

9. The uninterruptible power supply according to claim 8, wherein the upper limit value is set to a value according to a difference between the rated current of the uninterruptible power supply and a rated current of the second load.

10. The uninterruptible power supply according to claim 8, further comprising a current detector configured to detect an AC current supplied from the inverter to the second load, wherein
the upper limit value is set to a value according to a difference between the rated current of the uninterruptible power supply and a detection value from the current detector.

11. The uninterruptible power supply according to claim 8, wherein
the first detector includes:
a first current detector configured to detect an instantaneous value of a three-phase AC current supplied from the AC power source to the first load and the converter;
a phase detector configured to detect a phase of a three-phase AC voltage supplied from the AC power source; and
a first coordinate transformer configured to perform, based on a detection value from the phase detector, coordinate transformation of a three-phase AC current detected by the first current detector, and generate a first q-axis current having a value according to the first reactive current,
the second detector includes:
a three-phase reactor having one terminal configured to receive a three-phase AC current supplied from the AC power source, and having the other terminal connected to the converter;
a second current detector configured to detect an instantaneous value of a three-phase AC current flowing from the other terminal of the three-phase reactor to the converter; and
a second coordinate transformer configured to perform, based on a detection value from the phase detector, coordinate transformation of a three-phase AC current detected by the second current detector, and generate a second q-axis current having a value according to the second reactive current,
the reactive current instructing unit is configured to generate the reactive current instruction value based on the first q-axis current, and
the controller is configured to control the converter based on the second q-axis current and the reactive current instruction value limited by the limiter, and control the second q-axis current to reduce the reactive current instruction value.

12. The uninterruptible power supply according to claim 11, further comprising:
a voltage detector configured to detect a DC voltage supplied from the converter to the inverter; and
an active current instructing unit configured to generate an active current instruction value so that a detection value from the voltage detector matches a target DC voltage, wherein
the second coordinate transformer is further configured to generate a d-axis current having a value according to an active current supplied from the AC power source to the converter, and
the controller is further configured to control the converter so that the d-axis current matches the active current instruction value.

13. The uninterruptible power supply according to claim 8, wherein
the converter, the inverter, the controller, the limiter, the second detector, and the reactive current instructing unit constitute an uninterruptible power supply unit,
the uninterruptible power supply comprises a plurality of uninterruptible power supply units,
the first detector is provided to be shared by the plurality of uninterruptible power supply units, the first detector being configured to detect a first reactive current supplied from the AC power source to the first load and to the plurality of uninterruptible power supply units, and
the reactive current instructing unit of each of the uninterruptible power supply units is configured to generate the reactive current instruction value based on a value acquired by dividing a detection value from the first detector by the number of uninterruptible power supply units in operation among the plurality of uninterruptible power supply units.

* * * * *